Patented Feb. 6, 1945

2,369,083

UNITED STATES PATENT OFFICE 2,369,083

PROCESS OF PRODUCING PENTAERYTHRITOL

Harold M. Spurlin, Wilmington, Del., assignor to Hercules Powder Company, Wilmington, Del., a corporation of Delaware No Drawing. Application September 25, 1942, Serial No. 459,706

4 Claims. (Cl. 260—635)

This invention relates to an improved process for the preparation of pentaerythritol. More particularly, it is concerned with an improved method for recovering pentaerythritol from the crude reaction mixture of acetaldehyde and formaldehyde.

Pentaerythritol has been prepared according to different procedures described in the art by the condensation of acetaldehyde with formaldehyde in the presence of an alkaline catalyst. Considerable difficulty has been experienced in obtaining maximum yields of pentaerythritol due in part to the exacting conditions under which the reaction must be conducted and in part to the formation of by-products during the recovery of the pentaerythritol from the reaction mixture. Various methods have been described for the removal of the metal ion from the catalyst which is present as a formate. For example, calcium has been precipitated as the sulfate or oxalate in such a manner that formic acid has remained in the reaction mixture. In working up the pentaerythritol-formic acid solution, it has been general to concentrate and crystallize the pentaerythritol. In carrying out this concentration, however, non-crystallizable syrups have resulted due to the formation of formic esters by reaction between the pentaerythritol and the formic acid, thus reducing the yield of crystalline pentaerythritol.

Now, in accordance with this invention, a method has been found of recovering high yields of pentaerythritol from the crude pentaerythritol reaction solution resulting from the condensation of acetaldehyde with formaldehyde in the presence of an alkaline catalyst. The improved method involves hydrolyzing any pentaerythritol formate present in the reaction mixture, after the metal ion of the catalyst has been removed, by blowing steam through the reaction mixture. Formic acid is thereby liberated and removed. Thus, in carrying out the process of producing pentaerythritol involving condensation of acetaldehyde with formaldehyde in the presence of an alkaline catalyst followed by removal of the metal ion of the catalyst, steam is blown through the reaction mixture to hydrolyze any pentaerythritol formate present and to liberate the formic acid, and the liberated formic acid is removed.

Now, having indicated in a general way, the nature and purpose of the invention, the following examples will illustrate the invention but are not to be construed as limiting the same. In the examples, the ingredients are in parts by weight unless otherwise indicated.

Example 1

To 90 parts of formalin (35% formaldehyde) and 200 parts of water were added simultaneously 11 parts acetaldehyde and 9.5 parts calcium hydroxide. The reaction was carried out at a temperature between 18° C. and 41° C. for a period of six hours. After the reaction was complete, the condensate was acidified with carbon dioxide and filtered to remove excess lime and insoluble material. The filtrate was then concentrated in vacuo and crystallized alternately with removal of the crystals in 5 crops. Alcohol was then added to the filtrate to precipitate the alcohol-insoluble pentaerythritol - calcium formate crystallizable material from the alcohol-soluble non-crystalline syrups. The pentaerythritol-calcium formate crystalline material amounting to 46 parts was removed by filtration and then dissolved in 100 parts of water and acidified with 25 parts of 50% sulfuric acid. The precipitated calcium sulfate was removed by filtration and was given a displacement wash with water. The solution was then concentrated in vacuo to about 160 parts by weight and cooled to remove 12 parts of pentaerythritol. The reaction mixture was then blown with steam to hydrolyze any formates and 90 parts water containing formic acid distilled under reduced pressure. After thus concentrating the reaction mixture to 60 parts by weight, the reaction mixture was cooled and 3 parts by weight of pentaerythritol crystallized. Repetition of the steam sparge followed by further concentration yielded 2 parts of pentaerythritol. Continuation of this treatment 3 more times yielded 2 parts of pentaerythritol each time showing that steam sparging hydrolyzed the non-crystallizing formic esters that were present and removed the liberated formic acid. The yield of pentaerythritol at this stage was 23 parts by weight. The hydrolysis by means of steam was continued until substantially all of the pentaerythritol present as formate was recovered and the formic acid liberated was removed.

Example 2

To 175 parts of formalin (35% formaldehyde) and 370 parts of water were added simultaneously 22 parts of acetaldehyde and 20 parts calcium hydroxide. The reaction was carried out under the same reaction conditions as in Example 1. After the reaction was complete, the solution was acidified with 47 parts of 50% sulfuric acid. Calcium sulfate was removed by filtration and given a displacement wash with hot water. The filtrate and wash water were freed of the last of the calcium by the addition of oxalic acid and filtered.

The solution was concentrated in vacuo to about 150 parts by weight and cooled to remove 15 parts by weight of pentaerythritol. The solution was then blown with steam while being maintained at a temperature of about 90° C., under reduced pressure, and formic acid was liberated and removed. The reaction mixture was then cooled to obtain 6 parts by weight of pentaerythritol. Further sparging, removal of the liberated formic acid and cooling yielded 5 parts of pentaerythritol. Repetition of this yielded another 4 parts of pentaerythritol making a total yield at this stage 30 parts by weight of pentaerythritol. The hydrolysis by means of steam was continued until substantially all the pentaerythritol present as formate was recovered and the formic acid liberated was removed.

The normal formaldehyde-acetaldehyde ratio which may be used in carrying out the process of this invention may be from about 2.5 to 1 to about 6 to 1 and preferably from about 4 to 1 to about 5 to 1. A preferred ratio of alkaline content is from about 1.0 to about 1.2 equivalents per mol of acetaldehyde although more alkaline catalysts may be used if desired.

In carrying out the process of this invention, calcium hydroxide is preferred as the alkaline catalyst. However, other alkaline catalysts such as sodium hydroxide, potassium hydroxide, barium hydroxide, magnesium hydroxide, strontium hydroxide, and the like may be used.

In the examples, the hydrolysis of the formates in the reaction mixture is carried out by means of blowing steam into the reaction mixture. Other methods of hydrolysis may be used. For example, such as by adding water to the reaction mixture in quantities sufficient to cause the hydrolysis of the formates present and to liberate the formic acid. In the examples, a method for crystallizing the pentaerythritol from the reaction mixture has been shown. Other methods known to the art may be used if so desired.

The temperature of the reaction mixture during the hydrolysis of the formates may vary depending on the reaction conditions. If temperatures under 100° C. are used, the hydrolysis must be carried out under reduced pressure, and if temperatures over 100° C. are used, the reaction must be carried out with pressure. The exact conditions will be those necessary to volatilize water and formic acid at the temperature and under the reaction conditions present.

In the examples, a method of preparing the crude pentaerythritol solution is shown. However, any other method of carrying out the condensation may be employed. It is preferred, however, to use a method which will direct the reaction to the formation of pentaerythritol and keep side reactions at an absolute minimum. The time and temperature of the reaction may vary according to known ranges. The condensate may be acidified with any mineral acid as sulfuric or hydrochloric acid by any of the means known to the art. The metal ion of the catalyst may be removed in various ways. For example, if calcium hydroxide is used as the catalyst, the calcium may be precipitated from the reaction mixture as calcium sulfate. After the metal ion of the catalyst has been removed from the reaction mixture, if desired, the reaction mixture may be concentrated in vacuo and cooled and the crystallized pentaerythritol formed may be removed. The reaction mixture may then be treated, for example, by blowing with steam to hydrolyze any formates that may be present and liberate and remove the formic acid. Removal of the pentaerythritol by crystallization tends to shift the equilibrium and further hydrolysis sets free more pentaerythritol which can be, in turn, crystallized out of the reaction mixture. If desired, the alternate crystallization and hydrolysis may be continued until substantially all of the pentaerythritol has been crystallized from the reaction mixture and the liberated formic acid has been removed. However, if preferred, the steam may be blown into the reaction mixture continuously under the conditions whereby the pentaerythritol formate is hydrolyzed, and the formic acid volatilized, and may be continued until all of the formic acid has been removed.

When pentaerythritol is isolated by concentration of the acidified condensate of acetaldehyde with formaldehyde, the large amounts of formic acid set free react during the concentration to esterify the pentaerythritol and to catalyze reaction between the aldehydes and pentaerythritol. By the process of blowing with steam the reaction mixture, after the metal ion of the catalyst has been removed, to hydrolyze any formates that may be present in the reaction mixture, and to remove the liberated formic acid, a convenient and economical method is provided for recovering substantially all of the pentaerythritol from the reaction mixture, and removing the liberating formic acid.

What I claim and desire to protect by Letters Patent is:

1. A process for producing pentaerythritol comprising condensing formaldehyde with acetaldehyde in the pressure of an alkaline earth catalyst, precipitating out the metal ion of the catalyst, evaporating the solution thereby removing a part of the formic acid formed in the reaction, precipitating and filtering off the pentaerythritol crystals formed, blowing steam through the mother liquor to hydrolyze any pentaerythritol formate present and to liberate further formic acid, distilling off said liberated formic acid, and recovering additional pentaerythritol from the reaction mixture.

2. A process for producing pentaerythritol comprising condensing formaldehyde with acetaldehyde in the presence of an alkaline earth catalyst, precipitating out the metal ion of the catalyst, evaporating the solution thereby removing a part of the formic acid formed in the reaction, precipitating and filtering off the pentaerythritol crystals formed, blowing steam through the mother liquor under reduced pressure and at a temperature below 100° C. to hydrolyze any pentaerythritol formate present and to liberate further formic acid, distilling off said liberated formic acid, and recovering additional pentaerythritol from the reaction mixture.

3. A process for producing pentaerythritol comprising condensing formaldehyde with acetaldehyde in the presence of an alkaline earth catalyst, removing the metal ion of the catalyst, evaporating the solution thereby removing a part of the formic acid formed in the reaction, precipitating and filtering off the pentaerythritol crystals formed, blowing steam through the mother liquor under pressure and at a temperature above 100° C. to hydrolyze any pentaerythritol formate present and to liberate further formic acid, distilling off said liberated formic acid, and recovering additional pentaerythritol from the reaction mixture.

4. A process for producing pentaerythritol comprising condensing formaldehyde with acetaldehyde in the molecular ratio of from about 4:1 to about 5:1 in the presence of from about 1.0 to about 1.2 equivalents of calcium hydroxide per mol of acetaldehyde, precipitating the calcium with sulfuric acid, evaporating the solution thereby removing a part of the formic acid formed in the reaction, filtering off the pentaerythritol crystals formed in the concentration, blowing steam through the mother liquor to hydrolyze any pentaerythritol formate present and to liberate further formic acid, distilling off said liberated formic acid, and recovering additional pentaerythritol from the reaction mixture.

HAROLD M. SPURLIN.